Figure 1:
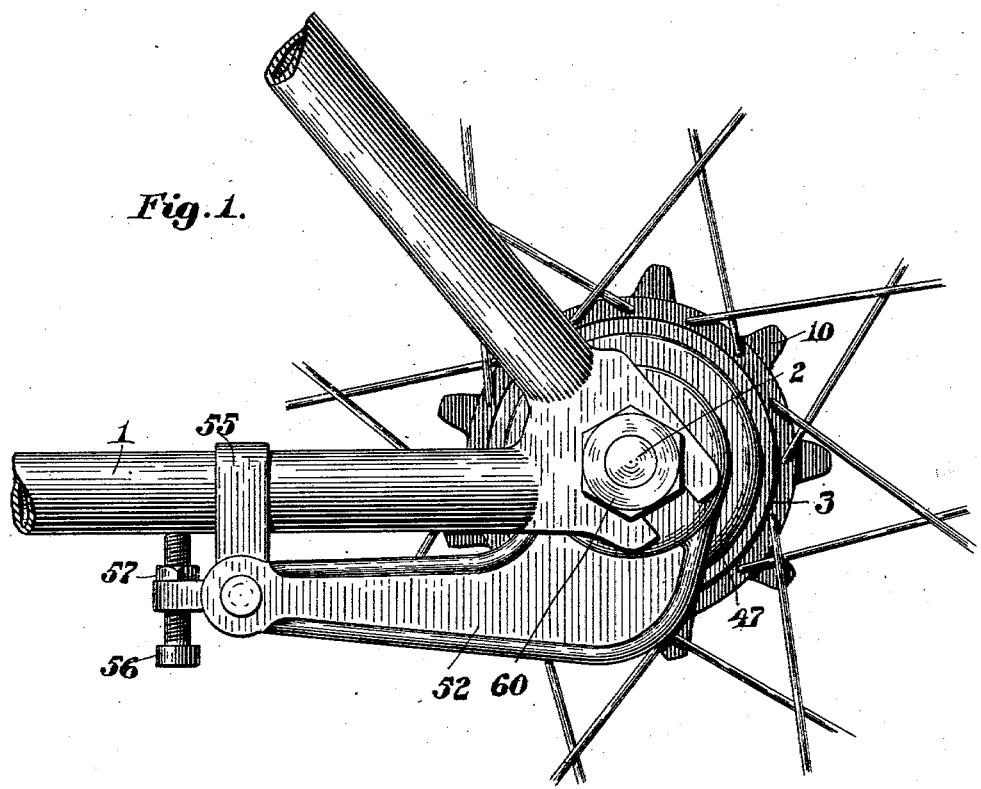

No. 745,524. PATENTED DEC. 1, 1903.
A. F. ROCKWELL.
DRIVING AND BRAKE MECHANISM FOR CYCLES.
APPLICATION FILED JULY 9, 1902.

NO MODEL. 2 SHEETS—SHEET 1.

Witnesses: Inventor:
Walter E. Lombard Albert F. Rockwell,
May A. Kenney by J. Hart Anderson
Atty.

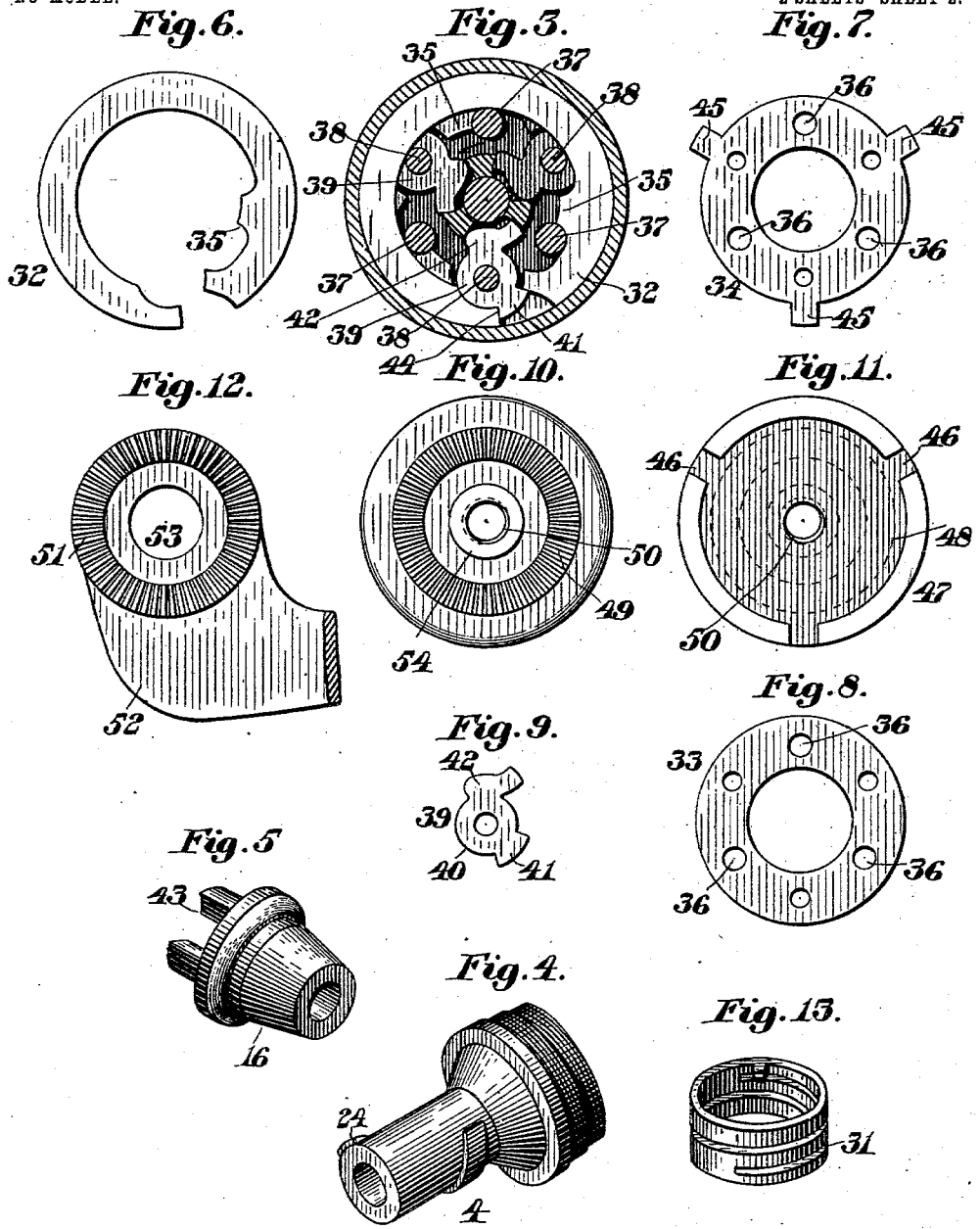

No. 745,524.                                                    Patented December 1, 1903.

UNITED STATES PATENT OFFICE.

ALBERT FENIMORE ROCKWELL, OF BRISTOL, CONNECTICUT.

DRIVING AND BRAKE MECHANISM FOR CYCLES.

SPECIFICATION forming part of Letters Patent No. 745,524, dated December 1, 1903.

Application filed July 9, 1902. Serial No. 114,860. (No model.)

*To all whom it may concern:*

Be it known that I, ALBERT FENIMORE ROCKWELL, a citizen of the United States, residing at Bristol, in the county of Hartford and State of Connecticut, have invented certain new and useful Improvements in Driving and Brake Mechanism for Cycles; and I do hereby declare the following to be a full, clear, and exact description of the invention, such as will enable others skilled in the art to which it appertains to make and use the same.

The present invention relates to driving and braking mechanism for bicycles and like vehicles, and more particularly to certain improvements in so-called "back-pedaling" brakes, free-coasting type, such as shown in my pending application, Serial No. 39,700, filed December 13, 1900.

Back-pedaling brakes for bicycles have been used quite extensively recently, and the preferred form of such brake comprises a so-called "split-ring" member which is expanded by suitable means and brought into contact with a coöperating braking member, usually a drum or flange carried by the hub of the driving-wheel of the bicycle. This form of brake is generally preferred for the reason that it acts radially, and thus does not put a spreading strain upon the hubs and bearings, as occurs in the use of laterally-movable brake devices. Heretofore these split-ring brakes have been made with quite a large segment removed for the purpose of affording a proper engagement of the anchoring device with the fixed end of the ring and also of the expanding device with the movable end of the ring, the result being that said split-ring brake member could have a braking contact with only a portion of the braking-drum.
This action of the brake has been found to be objectionable by reason of the loss of braking power and also by the unequal torsional strains brought to bear during the braking action upon the brake drum and hub.

The object of the present invention is to produce a brake having a brake member of the split-ring type so constructed and arranged as to cause a braking contact entirely around the drum, and thus produce an equal distribution of the braking power.

Further objects of the invention will appear in connection with the following description of the construction and mode of operation of my invention.

To the above ends the present invention consists of the devices and combinations of devices which will be hereinafter described and claimed.

The present invention is illustrated in the accompanying drawings, in which—

Figure 2:
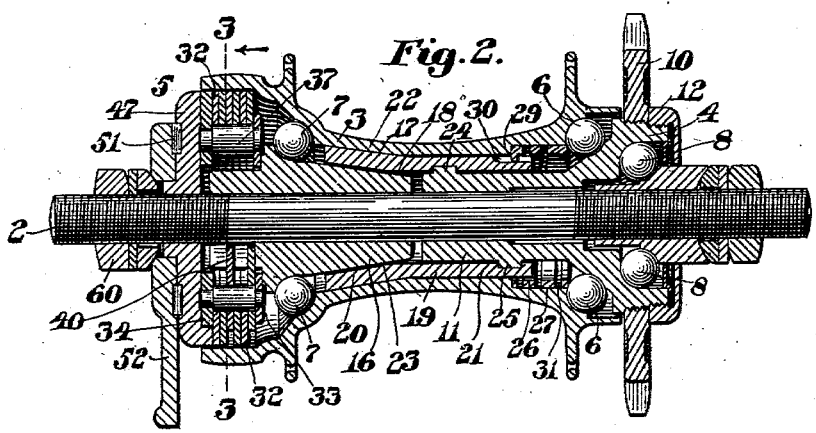

Figure 1 shows in side elevation a part of a bicycle frame and wheel, showing the hub and the brake anchoring-arm. Fig. 2 is a section taken though the hub embodying my improved mechanism. Fig. 3 is a section taken on line 3 3, Fig. 2, looking in the direction of the arrow in said figure. Fig. 4 is a perspective view of the driver with the sprocket venured. Fig. 5 is a perspective view of the brake-actuator. Fig. 6 is a side elevation of one of the brake-rings. Figs. 7 and 8 are elevations of the retaining-plates for the brake rings and levers. Fig. 9 shows one of the levers for operating the brake-rings. Figs. 10 and 11 are views of the outer and inner faces, respectively, of the supporting-plate for the movable brake member. Fig. 12 is a side view showing part of the anchoring-arm with the teeth for coöperating with those on the supporting-plate. Fig. 13 is a perspective view of the clutch-controller.

Similar reference characters will be employed throughout the specification and drawings to designate corresponding parts.

The rear fork of the bicycle is indicated by 1 and supports in any ordinary manner the axle 2. Upon the axle 2 is mounted the hub 3, a driver 4 being situated at one end of the hub, while at the other end is the brake mechanism, (designated as a whole by the numeral 5.) The hub is supported upon ball-bearings 6 and 7 and the driver upon ball-bearings 8, and these bearings may be of any desired character, as in and of themselves they form no part of the present invention.

The driver 4 comprises a suitable toothed wheel 10, which may be a sprocket-wheel, as shown, or any suitable gear-wheel to engage with either a sprocket-chain or a mating gear carried by the side rod of a chainless mechanism. The driver is also provided with a long sleeve 11, projecting well into the hub 3 and mounted to turn on the axle. The parts of the driver 4 may be integrally formed; but preferably the wheel 10 is threaded upon the sleeve 11 and is held in place by means of the combined lock-nut and dust-cap 12 screwed upon the outer end of the sleeve and bearing against the wheel 10. The driver 4 is adapted to be connected to the hub 3 when turned in a forward direction for driving the bicycle forward and with the brake mechanism 5 when turned in the opposite direction, as in back-pedaling. When the driver is held stationary or is rotated in a forward direction at less speed than the hub is turning, the hub and the bicycle-wheel are free to move independently of the driver, as in "coasting."

The brake mechanism consists of a brake-actuator 16, which is mounted to turn freely upon the axle 2, and is designed to be turned to actuate the brake when the driver is rotated in a backward direction in back-pedaling.

Suitable clutch mechanism is provided for connecting the driver with the hub upon a forward turning of the driver and with the brake-actuator to apply the brake upon a backward turning of the driver, and this clutch mechanism, which will now be described, is substantially the same as that set forth in my application hereinbefore referred to. It consists of a tapered socket or face 17, formed upon the interior of the hub 3, and a tapered clutch-face 18, formed on the brake-actuator 16, the faces 17 and 18 being substantially parallel and spaced apart, as shown. A movable clutch member connected with and operated by the driver-sleeve is designed to engage the clutch-face 17 on the hub or the clutch-face 18 on the brake-actuator, accordingly as the driver is turned forward or backward. This movable clutch member consists of a sleeve 19, which at one end is formed bell-shaped or flaring, as at 20, and at its other end is substantially cylindrical, as shown at 21. The flaring end of the movable clutch member is interposed between the clutch-face 17 of the hub and the clutch-face 18 of the brake-actuator and is provided with an external clutch-face 22, designed to engage the clutch-face 17, and an internal clutch-face 23, designed to engage the clutch-face 18. A lateral movement of the movable clutch member will cause it to become connected either with the hub or brake-actuator, according to the direction of such movement. This lateral movement is imparted by the driver 4, and for this purpose the driver-sleeve 11 is provided with an external spiral rib or ribs 24, which engage a corresponding spiral groove 25, formed upon the inner face of the cylindrical portion 21 of the movable clutch member.

The operation of all the parts heretofore described is the same as in my other application and need not be expanded upon here.

In order to insure a lateral movement of the movable clutch member, a controller is employed, as in the device of my former application; but the specific form thereof differs substantially from that previously shown. This controller consists of a sleeve 26 substantially cylindrical and fitted loosely in a chamber 27 within the hub 3, such sleeve bearing at one end against a shoulder 28 on the hub and at the other end against the balls of the bearing 6. This sleeve 26 has a closed spiral slot 31 cut through its wall, forming, as it were, a sort of spring, providing for a longitudinal expansion of the sleeve in its chamber, thus creating a slight resistance to the turning of said sleeve when the driver is turned for a purpose to be described. A lug 29 on the sleeve engages with a groove 30, formed in the movable clutch member.

The operation of the controller is as follows: When the driver 4 is moved in either direction, the tendency will be for it to carry along the clutch member 19, the object being, however, to give the clutch member merely a lateral movement. If there is a slight rotary movement of the clutch member, the walls of the groove 30 bear upon the lug 29, and as the end thrust of the sleeve 26 has a tendency to prevent said sleeve from turning with the driver the desired relative movement between the driver and the clutch-sleeve will be produced, causing the lateral shifting of the clutch-sleeve.

As in my previous application the brake of the present invention comprises as an element a so-called "split" ring. This ring, as illustrated, is designed to expand in the operation of braking; but it will be understood that a ring which contracts under the same conditions would fall equally within the scope of the present invention. Instead of using a single ring, as in my previous application, in the present case a plurality of such rings are employed, the object being to provide a continuous braking-surface. I accomplish this by the use of a plurality of rings, two or more, (six being shown in the drawings,) so arranged that the opening or space in one ring will be spanned by the solid portion of the adjacent rings, as clearly shown in Fig. 3. Each braking-ring is designated by the numeral 32, six such rings being shown, though the number may of course be varied. Each of these rings or leaves is provided with a shoulder 35, which is adapted to abut against one of a series of studs 37, secured at their respective ends in holes 36 in the plates 33 and 34. These studs, as clearly shown in Fig. 2, have a central portion of a length equal to the combined thicknesses of the several brake rings or leaves. The ends of the studs are reduced and may be fastened in holes 36 in any desired manner. In the drawings they are shown as riveted, and while that is the preferable mode of attachment, yet any other means may be used. Three of these studs 37 are shown, thus allowing the openings in such rings to be spaced at intervals of one hundred and twenty degrees along the circumference of the braking-surface with reference to the openings in the other rings. The plates 33 and 34 have also an additional series of studs or pintles 38, on which are pivotally supported the expanding-levers 39. There is an actuating-lever for each ring, and it consists, generally speaking, of a hub or body portion 40, actuating-lug 41, and an arm 42, engaging a groove 43 in the brake-actuator 16. When all of these parts of the brake are assembled, the plates 33 and 34 serve to contain between them a complete expanding brake member, which may be removed and carried about without danger of losing any of the parts, the studs 37 and pintles 38 retaining them in position. The grooves 43 in the brake-actuator preferably extend entirely to the end thereof, so that the actuator may be slipped in place after the parts are assembled.

The plate 34 has projecting from its edge a series of lugs 45, which are designed to enter recesses 46 in a flange of the adjusting-plate 47. This plate is recessed on one side, as at 48, to a depth substantially equal to the thickness of the plate 34, and the flange in which the recesses 46 are formed extends outwardly from this main depression. On the outer side of the plate 47 is a series of radial teeth 49, while a central threaded opening 50 is provided for screwing the plate onto the axle 2. The teeth 49 are arranged to be engaged by corresponding teeth 51, carried by the anchoring-arm 52. This arm 52 has an opening 53, adapted to fit a central boss 54 on the plate 47, and it is held in position with its teeth intermeshing with those of the plate by means of nuts 60 on the axle 2. The outer end of the anchoring-arm is fastened to the fork 1 by means of a strap 55, thus relieving the nuts 60 and the axle to a great extent of stresses imposed upon the brake mechanism and securely locking the brake-plate in position.

It will be noted that by forming the brake-supporting plate and its anchoring-arm in two parts with the coöperating holding-teeth upon their meeting faces I provide for the ready and quick adjustment of the supporting-bearings from the brake end of the hub, as by loosening up the nuts 60 sufficiently to release the engagement of the mating teeth 49 and 51 the plate 47 may be turned upon the threaded portion of the shaft 2, and thus tighten up or loosen the parts to properly adjust the bearings 6, 7, and 8, and this without the necessity of disconnecting the anchoring-arm 52 from the frame of the machine, the adjustment being maintained by again setting up the nuts 60 to cause the locking engagement of the teeth 49 and 51. I consider this manner of securing the adjustment of the bearings to be an important feature of the present invention.

In practice it is found that the strap 55 is apt to be too long, thus allowing a backlash in the braking action. To remedy this defect, I propose to place near the free end of the arm 32 a set-screw 56, designed to bear against the frame 1. If the strap is too long, the set-screw is adjusted to take up the play. A lock-nut 57 locks the set-screw in its adjusted position.

The brake rings and levers are assembled between the retaining-plates 33 and 34. The actuator 16 is put in place. The adjusting-plate 47 is set up over the end of the mechanism with the plate 34 and its projections 45 engaging the recess 48 and the notches 46. The whole is now screwed onto the axle to the desired position, after which the anchor arm is set upon the boss 50 with its teeth meshing with those of the adjusting-plate. The strap 55 is then secured to the frame, the nuts 60 are tightened, and the set-screw 56 is adjusted to lock the anchor firmly in place.

The operation of the device is as follows: When the rider of the bicycle wishes to propel the wheel, the pedals are rotated in a forward direction, thereby imparting a similar movement to the driver 4. The screw connection between the driver and movable clutch member causes a lateral shifting of such member and a consequent engagement of the clutch-faces 17 and 22, thereby connecting the hub and driver so that they rotate together. If the rider desires to "coast" or to move the pedals at a lower rate of speed than will serve to operate the bicycle-wheel, then there is a reversal of the action of the movable clutch member, but not a sufficient reversal to apply the brake. If, on the other hand, it is desired to apply the brake, a backward pressure is applied to the pedals and through them to the driver 4, the movable clutch member being moved toward the left of Fig. 2 and engaging with the brake-actuator 16. The actuator is turned backward, or (referring to Fig. 3) in a counter-clockwise direction, the walls of the groove 43 acting upon the heels 42 of the levers 40 and causing the ends 41 thereof to impinge against the ends 44 of the rings, spreading them and causing them to be forced into contact with the brake, flange, or drum of the hub. The lugs 35 on the other ends of these rings abut against one or the other of the studs 37, thus preventing slipping of the rings. During the application of the braking force the rings are therefore expanded into the hub and create a frictional resistance to an extent dependent upon the amount of force applied.

It will be noted that by forming the brake-ring of sections arranged as shown a continuous braking-surface is produced and a certain flexibility whereby the braking force is evenly distributed and any irregularity of wear prevented. This flexibility insures a more efficient operation in that a slight distortion of one member will not affect the others, while where a single ring is used any slight distortion of the ring throws out of operation a large percentage of the braking-surface.

The controller illustrated provides a very simple and efficient means for insuring the necessary relative turning of the driver and movable clutch-sleeve to cause said driver to shift said clutch-sleeve laterally.

While the preferred form of the present invention has been illustrated and described, I do not wish to be understood as limiting the invention to that specific form.

Having described my invention, I claim as new and desire to secure by Letters Patent of the United States—

1. In combination, a brake member comprising a plurality of open spring-rings having separated ends arranged with the opening in one ring spanned by the closed portion of an adjacent ring, means for moving the ends of each ring with relation to each other whereby to operate said brake member, and a brake-drum, substantially as described.

2. In combination, an expanding-brake member comprising a plurality of open spring-rings having separated ends supported in close relation to each other and having the openings in adjacent rings staggered as described, means to hold one end of said rings and means to move the other end of said rings for expanding said rings to cause them to engage a brake-drum, substantially as described.

3. In combination, an expanding brake member comprising annular retaining-plates, a plurality of open spring-rings having separated ends and their expanding-levers supported between and held by said plates, means for permanently connecting said annular plates, means to rock said expanding-levers, and a coöperating brake-drum, substantially as described.

4. In combination, a wheel-hub and its bearings, a driver at one end of the hub, a supporting-plate for one of the brake members, an anchoring-arm, and an adjustable locking connection between said plate and arm, substantially as described.

5. In combination, an axle, a wheel-hub, a driver, suitable ball-bearings for supporting the hub and driver on the axle, a brake-holding plate adjustably connected to said axle arranged to be moved along said axle to adjust the bearings of the hub and driver and an anchoring-arm detachably connected to said brake-holding plate, substantially as described.

6. A driving and brake mechanism for cycles, having in combination, a wheel-hub, a driver, a brake-holding plate and its anchoring-arm, a looped strap and its fastening means for locking the said arm to the frame of the bicycle and an adjusting-screw for taking up the slack in said strap, substantially as described.

7. A driving and brake mechanism for cycles, having in combination, a wheel-hub, a driver, a brake-holding plate and its anchoring-arm, a looped strap and its fastening means for locking the said arm to the frame of the bicycle and an adjusting-screw carried by the arm, substantially as described.

8. In combination, a brake mechanism comprising a movable brake member, a supporting-plate therefor, an anchoring-arm for said plate and locking-teeth between said plate and arm, substantially as described.

9. A driving and brake mechanism for cycles, having in combination, a hub, a brake, a driver, clutch mechanism actuated by the driver for connecting the driver with the hub and brake, said clutch mechanism comprising a laterally-shifting clutch-sleeve, and a slotted sleeve fitted in the hub and engaging the clutch-sleeve, substantially as described.

10. A driving and brake mechanism for cycles, having in combination a wheel-hub, a driver, a brake-holding plate and its anchoring-arm, means for connecting the anchoring-arm to the frame of the bicycle and an adjustable screw or stop for preventing movement of said anchoring-arm with relation to the frame of the bicycle, substantially as described.

11. The combination of a brake element comprising a plurality of brake members and retaining-plates between which said members are mounted and held, a support and a detachable connection between said brake elements and said support.

12. The combination of a brake member comprising a plurality of parts, of retaining-plates between which said parts are mounted and held, a supporting-plate and a detachable connection between one of the retaining-plates and the supporting-plate, substantially as described.

13. The combination with a divided-ring brake member and its operating-lever, of retaining-plates between which said brake member and its lever are mounted and held, a supporting-plate and a detachable connection between one of the retaining-plates and the supporting-plate, substantially as described.

In testimony whereof I affix my signature in presence of two witnesses.

ALBERT FENIMORE ROCKWELL.

Witnesses:
C. S. TREADWAY,
WM. A. GRAHAM.